Sept. 22, 1964    V. LAFON    3,150,043
ANORECTIC COMPOSITION
Filed Feb. 20, 1962
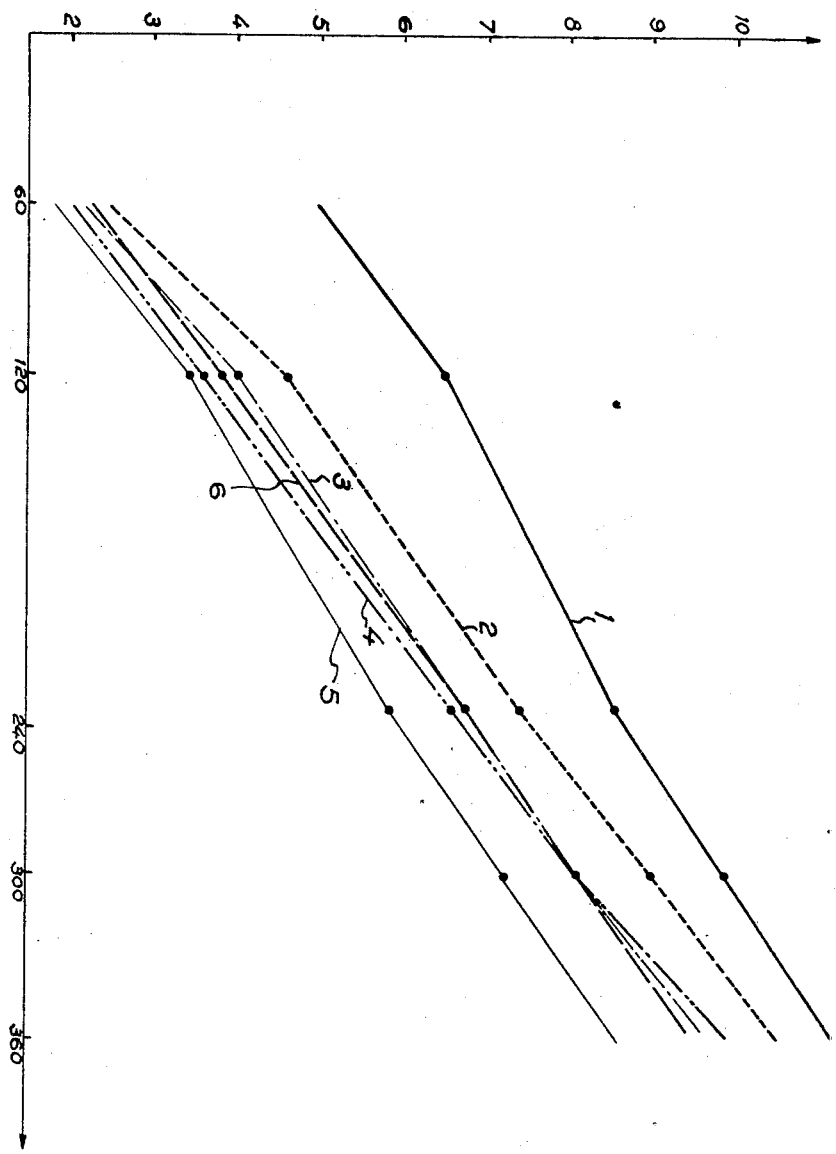

United States Patent Office 3,150,043
Patented Sept. 22, 1964

3,150,043
ANORECTIC COMPOSITION
Victor Lafon, Paris, France, assignor to Orsymonde,
Paris, France, a French society
Filed Feb. 20, 1962, Ser. No. 174,512
Claims priority, application France Feb. 23, 1961
3 Claims. (Cl. 167—55)

Various medicaments which are used for the treatment of obesity are known and amphetamine and 1-phenyl-2-aminopropane and various derivatives of the latter compound have recently been employed for this purpose.

However, these substances have numerous disadvantages, due mainly to the excitation which they cause, and other substances are continually being sought, although these derivatives satisfactorily moderate the appetite and counter the sensation of fatigue produced by dietetic restriction.

To this end, another compound having much the same properties as amphetamine has been used, namely, 1-phenyl-2-diethylamino-propanone-1 hydrochloride.

This known compound can be prepared by the method described by J. J. Hyde (J. Am. Chem. Soc., 50 (1928), 2290); the hydrochloride melts at 168° C. and some of its pharmacodynamic properties are known.

The mean toxic dose in the mouse by intraperitoneal administration is 190 mg./kg. and the active dose which causes anorexia in the rat is 9 mg./kg. by intraperitoneal administration; this dose causes a locomotor action in the rat.

Clinical results obtained with this compound are also known, which confirm that it is an excellent anorectic in man; however, secondary effects have been reported, which, though rare, prevent this compound from being prescribed indiscriminately.

In fact, it is known that 10% of patients treated with this compound have suffered one of the following secondary effects, namely, flatulence, regurgitation, constipation and slight nervousness.

This compound thus provides some improvement over amphetamine and its derivatives, but it is still not perfect from a clinical standpoint.

From its research, the applicant, in seeking an anorectic free from undesirable secondary effects, has discovered the surprising fact that the association of the above-mentioned compound and a high polymer produces a clearly improved anorectic action as compared with the compound itself, the duration of which can be prolonged; the toxicity and stimulant action of the compound are not increased, however.

The high polymer which is associated with the compound is a polyoxyethylene-polyoxypropylene-polyoxyethylene glycol and has the following formula:

$$HO-(C_2H_4O)_x-(C_3H_6O)_y-(C_2H_4O)_z-H$$

wherein $(C_2H_4O)_{x+z}$ represents from 20% to 90% by weight of the material and $y$ is equal to at least 15.

Preferably, the compounds are used in which $x+z$ (ethylene oxide) represents 80%–90% while $y$ (propylene oxide) has a molecular weight ranging from 1500 to 1800. The high polymer obtained has a molecular weight of 7500 to 8250.

The pharmacodynamic properties of such a high polymer have been described in British Patent No. 840,155.

The applicant, in its research, has verified the properties of the anorectic compound, which is referred to below as "A," and which is 1-phenyl-2-diethylaminopropanone-1 hydrochloride.

The means toxic dose of the compound A by intraperitoneal administration to mice has been found to be 167 mg./kg.; by gastric administration, the mean toxic dose is 385 mg./kg.

These doses are clearly much higher than the corresponding doses of amphetamine and it can be concluded that the compound A is 1.5 times less toxic than amphetamine.

The sympathomimetic, cardiovascular and cortical stimulant effects of the compound A are clearly less than those of amphetamine.

In contrast, the anorectic effect of A is excellent. A dose of 5 mg./kg. administered intraperitoneally to a rat causes a marked anorectic effect; 20 mg./kg. of A administered similarly causes the same anorectic effect as that due to the absorption of 5 mg./kg. of amphetamine; with gastric administration, the results are similar.

Furthermore, the applicant has verified that the high polymer defined above does not itself possess any anorectic action whatsoever.

To study the anorectic effect of the composition of the invention, the high polymer was first administered orally and A intraperitoneally; this test was carried out on male rats of the Wistar strain of weights ranging from 80 to 130 g. and submitted to preliminary fasting for 3 days; 4 different groups were used; the compound A was injected intraperitoneally into the rats of one group; isotonic physiological solution was injected intraperitoneally into the rats of another group; the compound A was injected, also intraperitoneally, while gastrically administering the high polymer to the rats of the 3rd group, and the high polymer alone was given to the rats of the 4th group.

Food was available to all the rats, in containers which were weighed regularly every ½ hour in order to determine the volume of food absorbed by the rats in each group.

It was thus determined that the effect of the compound A, when associated with the high polymer, is increased in intensity and also is markedly prolonged in duration as compared with the effect of A alone.

Such an experiment has the purpose of determining whether the synergistic action of the high polymer on the compound A is of a physiological kind or whether it is of a physico-chemical kind caused in vitro by simple admixture of the constituents.

It can be thought that the compound A injected was, in a first stage, returned to the digestive system, for instance by being eliminated in the bile at the duodenum; it is in the intestine where the high polymer has an effect, since it is substantially not absorbed by the system, as prior studies have shown.

It has thus been verified that the synergism of the composition is of a physiological kind.

In a second series of experiments, tests were carried out on groups of 10 rats by giving the rats, by buccal administration, mixtures comprising 10 mg./kg. of the compound A and doses of the high polymer ranging from 10 mg./kg. to 150 mg./kg.

For each composition, the tests were carried out on 4 groups each comprising 10 animals; the results of these tests are illustrated in the accompanying drawings, in which time is plotted as the abscissa and the average consumption of food per rat of a given group is plotted as the ordinate.

Curve 1 corresponds to control rats;

Curve 2 corresponds to the absorption of 10 mg./kg. of compound A alone;

Curve 3 corresponds to a composition of 10 mg./kg. of compounds A and 25 mg./kg. of the high polymer;

Curve 4 corresponds to a composition of 10 mg./kg. of compound A and 50 mg./kg. of the high polymer;

Curve 5 corresponds to a composition of 10 mg./kg. of compound A and 100 mg./kg. of the high polymer;

Curve 6 corresponds to a composition of 10 mg./kg. of compounds A and 150 mg./kg. of the high polymer.

It can be seen that the anorectic effect is most marked for the composition including 10 mg./kg. of compound A and 100 mg./kg. of the high polymer.

The effect of the addition of the high polymer on the toxicity and cortical effect of the compound A has also been studied.

These tests were carried out on female mice of weights ranging from 16 to 25 g., into which compound A had been injected intraperitoneally in doses ranging from 100 to 200 mg./kg. With some of the mice, the high polymer was administered gastrically in similarly varying doses.

It was thus shown that, in the different groups of mice receiving either compound A alone or compound A plus the high polymer, the mean toxic doses are of the same order.

To study the cortical stimulant action, the test devised by S. A. Gunn and M. R. Gurd (J. Physiol., 97 (1940), 453) was used. Mice were subjected in groups to a temperature of the order of +26° C. The high polymer alone administered gastrically in doses of 50/100 mg./kg. exerts no cortical stimulant effect and no mortality of the animals was observed when subjected to a temperature of 26° C. for 8 hours.

The compound A administered intraperitoneally in a dose of 20 mg./kg. does not cause mortality under the same conditions, although a dose of 120 mg./kg. caused the death of 50% of the mice.

Association of the high polymer with compound A tends to diminish its toxicity.

To confirm this result, other experiments were carried out using the high polymer associated with amphetamine and it was observed that the high polymer tends to diminish the cortical stimulant action of amphetamine. It was also observed that the simultaneous gastric administration to rats of 100 mg./kg. of the high polymer and 2.5 to 20 mg./kg. of compound A has no effect on the stimulant effect of compound A.

It was thus shown that compositions containing 1-phenyl-2-aminopropanone-1 and the high polymer defined above in proportions of the order of 1:5 to 1:10 have remarkable anorectic properties, of an amplitude and duration greater than the former employed alone and not causing any increase in the cortical stimulant action nor in the toxicity of the former.

Clinical tests have been carried out, which have confirmed the results given above and for which the following compositions were used:

EXAMPLE 1

| | G. |
|---|---|
| Compound A | 0.025 |
| High polymer | 0.250 |
| Excipient Q.S., for a cachet, capsule or tablet. | |

EXAMPLE 2

| | G. |
|---|---|
| Compound A | 0.035 |
| High polymer | 0.350 |
| Excipient Q.S., for a cachet, capsule or tablet. | |

EXAMPLE 3

| | G. |
|---|---|
| Compound A | 0.040 |
| High polymer | 0.200 |
| Excipient Q.S., for a cachet, capsule or tablet. | |

EXAMPLE 4

Coated tablets having the following composition were made:

*Centre*

| | G. |
|---|---|
| Diethylamino-propiophenone hydrochloride | 0.025 |
| Polyoxyethylene/polyoxypropanediol-1,2-polymer | 0.100 |
| Levilite | 0.035 |
| Lactose | 0.105 |
| Sugar | 0.015 |
| Starch | 0.015 |
| Talc | 0.002 |
| Sodium lauryl-sulphate | 0.001 |
| Magnesium stearate | 0.002 |

Levilite is calcium aluminum silicate pentahydrate having the formula $CaO \cdot Al_2O_3 \cdot 3SiO_2 \cdot 5H_2O$ and also known as Levynite.

This centre was coated by means of sugar, talc, gelatin and wax and tartrazine yellow was used as a colourant.

The unit doses set out above can be taken, preferably, 2 to 3 or even 4 times a day and it has been observed that the medicaments are satisfactorily tolerated in such dosages.

A number of clinical tests have been carried out with various compositions containing the high polymer and compound A in respective proportions by weight ranging from 2:1 to 15:1. The conclusions drawn from a series of experiments made with tablets according to Example 4 are given below.

In hospital tests, which were carried out at the Hôpital de la Pitié, Paris (France), the usual rules prescribed for anorectic administration were followed:

Distribution of the medicament was made at fixed times (10:00 a.m. and 4:00 p.m.), The tablets were given to patients tested at the time, which was thus controlled.

The prescription was reserved for patients for whom weight-reduction was desirable: patients who were obese through dietetic habits of long standing, over-fat patients and over-weight patients (often the cause of a chronic condition).

Obesity or over-weight was naturally not the reason for any patient being in hospital.

The prescription was necessarily camouflaged. The idea of weight-reduction by reducing the appetite by means of a drug is often followed up in patients by psychological changes which hinder interpretation of the results.

In one sense, the placebo effect is itself sufficient to obtain an average reduction of 200 g. per week.

In another sense, negativism and the will to improve falsify all true results concerning the appetite and, in an entire ward, tend to detract from the medicinal motives involved.

At any rate, by completely objective results, namely—

The weight of the patient;

Quantitative evaluation of the excretia (diuresis, perspiration, intestinal functions);

estimation of the appetite involves many subjective factors and, without directly questioning the patients, the information provided by the wards on change in the eating habits of the patients, known to them for a long time, is of a very high quality. Weight comparison of the ingesta before, during and after the treatment gave the only objective indication of variation in appetite.

The results observed with 37 subjects of both sexes and various ages (23 to 82) are given below, who were in hospital for a variety of reasons. They were tested some time after the operative period. The co-existence of a diabetic, a cardiopathic, a goitre, minor psychiatric disturbances, cirrhosis with hepatic insufficiency, after-effects of hemiplegia and after-effects of gastrectomy, allowed the tolerance of the medicament to be confirmed and also its lack of incompatibility with other therapeutic medicines.

(1) ACTION ON THE APPETITE

This action is clear. It appeared after giving only two tablets per day and was even better, being more constant, with a dose of 4 tablets per day. It is clearly difficult to calculate this effect, because man has a tendency to force himself to eat in spite of a lack of appetite. This anorexia is a subjective or objective sign.

Subjectively, the patient tested spontaneously blamed the drop in his appetite and complained about it.

Objectively the patient is urged by his surroundings and the treatment to be less inclined to eat.

(2) ACTION BY REDUCTION IN WEIGHT

A reduction in weight proportional to the duration of treatment was regularly obtained; on average, 4 kilograms a month, 1 to 1.5 kilograms in 10 days.

The weight-reduction effect was on average five times better than the placebo effect.

(3) ASSOCIATED EFFECTS AND TOLERANCE

The certainty of a completely readily handled medicament is obtained, without risk, counter-indications or any instance of intolerance or sensibilisation.

There may be mentioned:

The absence of a psychotropic effect; no insomnia, no excitation, no emotivity or irritability, no headache, no modification of character.

The absence of gastric intolerance, even with subjects who habitually complain of pyrosis.

On the same plane, the medicament causes no change in intestinal transit; both constipated patients and those who normally produce frequent and soft stools observed no change.

On the contrary, an increase in diuresis, as compared with usual, was noted. Its inconstant character can be confirmed, however, and also the absence of any physicochemical modifications in the urine and the absence of any renal secretory disorders. This banal polyuria, apparently connected with an increase in the hydric product, has no parallel with the variation in the appetite and the loss in weight.

Thirdly, the excellent compatibility of the medicament with others prescribed for the patients was observed in a constant manner (in particular, antibiotics, antidiabetic sulphamides, tonicardiacs, and intestinal transit modificants).

The absence of interference by the medicament was also noted on the various metabolisms and on the various functions in an inactive life.

No modification of the pulse nor of the arterial pressure (perfect tolerance by vascular sclerotics);

No hyperthermia or perspiration;

No change in protidemy or electrophoresis;

No change in sugar metabolism and no effect in one sense or the other on the diabetic state;

No change in the blood picture;

In patients who allowed comparative tests to be made, no change in their electrocardiograms, no change in basal metabolism nor in iodine 131 fixation;

Geriatric patients tolerated the treatment in exactly the same way as the youngest subjects.

In summarising the therapeutic action according to the duration of treatment, reference can be made to:

The absence of habituation to the product, which remains as active at the end of the third ten-day period as in the first;

Regain of appetite after cessation of the treatment;

Efficacy of a therapeutic resumption after a more or less long period of rest.

It is in these cases in particular in which it appears of most interest to emphasise the absence of sensibilisation phenomena, particularly the absence in the patients tested of cutaneous manifestations.

The clinical experiments summarised above showed that the medicament behaves as an anorexigenic medicament regularly active on reduction in weight. This is obtained progressively, without sacrifice and without psychological disturbance, and especially with a remarkable absence of associated secondary effects.

It seems to have a chosen place in the struggle against overweight which is an important factor in morbidity and mortality.

It is essential to emphasise that, with simple obesity complicating long-standing polyphagia, the medicament is effective and without risk in the cure of adipose conditions which can complicate certain organic pathological states; cirrhosis, hemiplegia, cardiopathy, heart failure.

The optimum posology appears to be 4 tablets (or pills) per 24 hours, in two doses, one at 10:00 a.m. and the other at 4:00 p.m. This requires to be followed for a month without interruption.

In the quite rare case of monstrous obesity or in the case of insufficiently conclusive objective results, 3 pills or tablets can be conveniently taken each time.

What I claim is:

1. A pharmaceutical composition having anorectic properties, which comprises a compound selected from the group consisting of 1-phenyl-2-diethylamino-propanone-1 and its hydrochloride and a high polymer of the formula:

$$HO-(C_2H_4O)_x-(C_3H_6O)_y-(C_2H_4O)_z-H$$

wherein $(C_2H_4O)_{x+z}$ represents from 20% to 90% by weight of the compound and $y$ equals at least 25, said polymer potentiating the anorectic properties of the propanone and prolonging the anorectic properties thereof.

2. A pharmaceutical composition according to claim 1, in unit dosage form for oral administration, in which the 1-phenyl-2-diethylamino-propanone-1 and the high polymer are present in the proportion by weight ranging from 1:2 to 1:15.

3. A tablet of enhanced and prolonged anorectic action, the centre of which comprises:

| | |
|---|---|
| Diethylamino-propiophenone hydrochloride | 0.025 |
| $HO-(C_2H_4O)_x-(C_3H_6O)_y-(C_2H_4O)_z-H$ wherein $(C_2H_4O)_{x+z}$ represents from 20% to 90% by weight of the compound and $y$ equals at least 25 | 0.100 |
| Calcium aluminum silicate pentahydrate | 0.035 |
| Lactose | 0.105 |
| Sugar | 0.015 |
| Starch | 0.015 |
| Talc | 0.002 |
| Sodium lauryl-sulphate | 0.001 |
| Magnesium stearate | 0.002 |

References Cited in the file of this patent

UNITED STATES PATENTS 3,001,910 Schutte _____ Sept. 26, 1961

OTHER REFERENCES

Pluronics, Apr. 23, 1958, page 9.